Sept. 19, 1967        H. J. WANDERER        3,342,915
UNDERCUT MOLDING APPARATUS AND METHOD
Filed Feb. 3, 1965
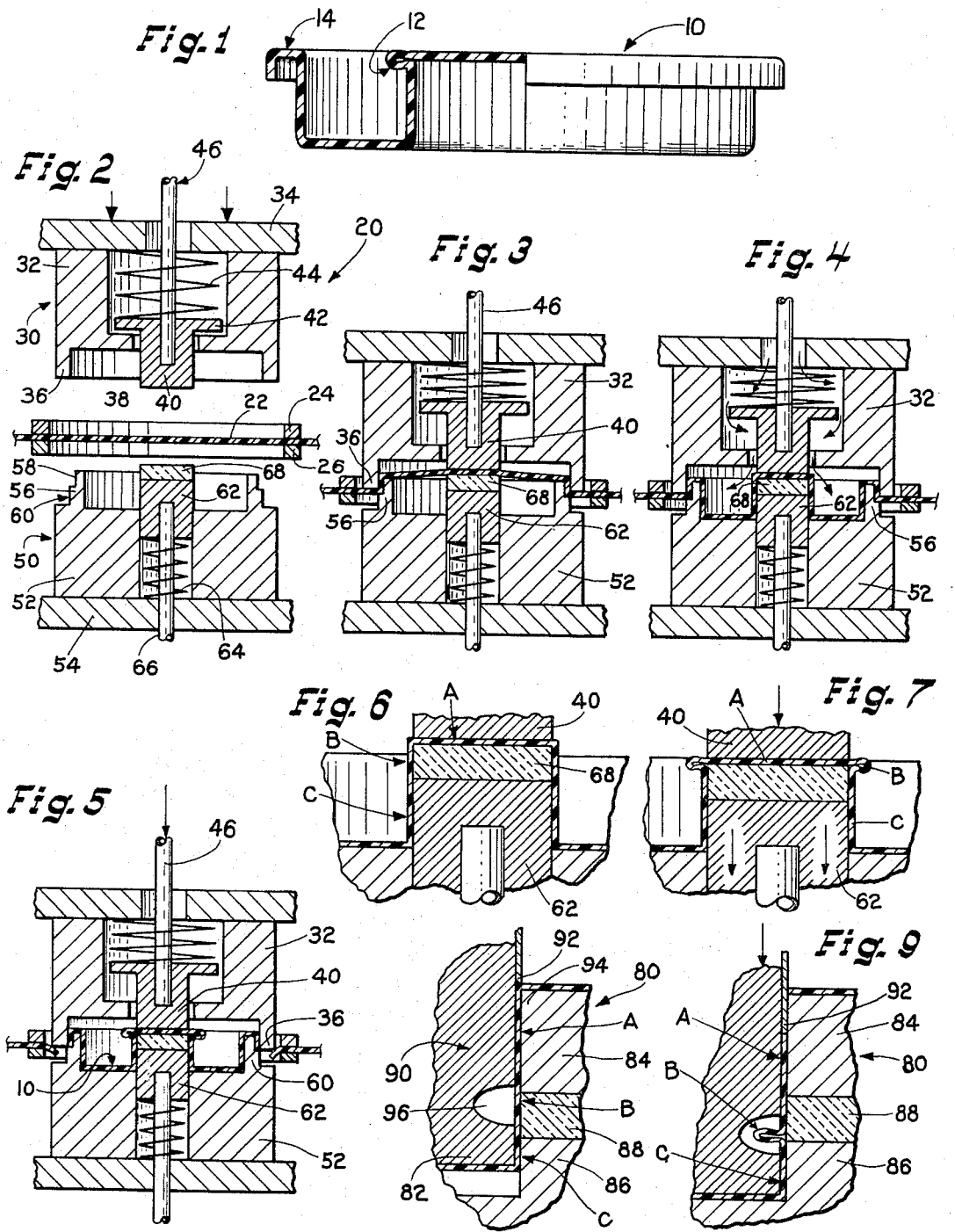
INVENTOR.
Herbert J. Wanderer
BY
His Att'ys

United States Patent Office 3,342,915
Patented Sept. 19, 1967

3,342,915
UNDERCUT MOLDING APPARATUS AND
METHOD
Herbert J. Wanderer, Elmhurst, Ill., assignor to Illinois
Tool Works Inc., Chicago, Ill., a corporation of Delaware
Filed Feb. 3, 1965, Ser. No. 430,055
9 Claims. (Cl. 264—92)

The present invention relates to a method and apparatus for molding articles from a heated web of thermoplastic material, and more particularly, to a method and apparatus for molding or forming relatively deep undercuts in thin wall products such as containers, lids, and the like.

Conventional techniques for fabricating plastic articles having undercuts or reverse bend sections therein require the use of mold members having movable parts, i.e., split molds, expanding collets and the like. These moving mold members normally have a sideways or lateral displacement in a first direction during the forming of the article to obtain the undercut or reverse bend section, and then a movement in an opposite direction to permit ejection of the formed article. The expanding collet or split mold approach has been quite successful in forming relatively deep undercuts in various portions of a mold article, but they have some notable disadvantages. Split molds and expanding collets are difficult and expensive to manufacture due to the necessity of a precision fitting between the parts as well as requiring an accurate control of their movement. Slight variations in either the fitting or movement of such parts will create undesirably large mold parting lines and other deformities in the molded article. The production rate is also limited by virtue of the fact that several movements of the mold parts are required, and this will obviously tend to slow down the molding process.

For these and other reasons, the forming of undercuts or reverse bend sections in a molded article is a fertile area for improvements. One recent patented approach which avoids some of the aforementioned difficulties is disclosed in U.S. Patent No. 3,126,582. In that patent, a web of plastic material is vacuum formed around a mold member carrying a disc-like piece of resilient material which projects beyond the edge of an adjacent mold section, and which facilitates stripping of the formed part from the mold without the need of having a movable mold member. It will be apparent, however, that the size and the shape of the undercut will be limited, and it would be impossible to achieve little or no spacing between the portions of the article constituting the undercut or reverse bend section.

Another approach which has solved the problems inherent in split molds or expanding collets without creating undesirable side effects is disclosed and claimed in copending application No. 285,463 filed June 4, 1963, now Patent No. 3,204,553 and assigned to the same assignee of the present invention. As disclosed in that application, selected portions of a heated web of thermoplastic material may be frozen so as to rigidify the same, and permit the unfrozen portions of the web to be moved and folded underneath the frozen or rigidified portions to form an undercut or reverse bend section. The present invention deals generally in the area of the aforesaid patent application, but discloses another approach to forming relatively deep undercuts or reverse bend sections in a molded article without any of the aforementioned difficulties.

Accordingly, it is an object of the present invention to provide a novel method and apparatus for forming relatively deep undercuts, ribs, reverse bend sections and the like in a molded article.

It is another object of the present invention to provide a novel and unique method and apparatus for forming undercuts at various locations in thermoplastic articles, and which may be of any size and shape.

Another object of the present invention is the provision of a method and apparatus for forming undercuts, ribs and similar constructions in a molded article each of which have smooth and uninterrupted surfaces.

A further object of the present invention is the provision of a novel method and apparatus which forms relatively deep undercuts in a molded article in a fast, repetitive and economical manner.

Still another object of the present invention is the provision of a new and unique method and apparatus for forming undercuts in a molded article without the need of expanding collets, split molds or other complex apparatus.

Yet another object of the present invention is the provision of an apparatus which employs simplified tooling so as to minimize part wear and machine down time.

Other objects and advantages will become apparent from the following description when read in connection with the accompanying drawings wherein:

FIG. 1 is an elevational view, partly in section of an article having an undercut therein which is formed in accordance with the teachings of the present invention;

FIG. 2 is a semi-diagrammatic sectional view showing the parts of the apparatus which are used in forming the article shown in FIG. 1, and at the beginning of the molding cycle;

FIG. 3 is also a semi-diagrammatic sectional view similar to FIG. 2, and showing the parts of the apparatus at the second stage of the molding cycle;

FIGS. 4–5 are also semi-diagrammatic sectional views of the apparatus, and showing the parts thereof at the third and fourth stages respectively of the molding cycle;

FIG. 6 is an enlarged semi-diagrammatic sectional view of a part of the apparatus shown in FIG. 4 in the vicinity of where the undercut is to be formed;

FIG. 7 is also an enlarged semi-diagrammatic sectional view of a portion of the apparatus shown in FIG. 5, and showing the manner in which the undercut or reverse bend section is formed; and FIGS. 8–9 are fragmentary sectional views illustrating another method and apparatus for forming undercuts or reverse bend sections in a molded article.

Referring now to the drawings wherein like parts are designated by the same numerals throughout the various figures, a molded article such as the lid or closure member 10 as shown in FIG. 1 may be formed with an undercut or reverse bend section 12, and, if desired, with a rim or lip portion 14 by employing the apparatus 20 disclosed in FIGS. 2–7 of the drawings. It will be observed that only those portions of the apparatus which are necessary for understanding of the present invention have been shown, and that suitable conventional means may be employed for advancing the parts of the apparatus, establishing a vacuum or pressure, etc.

The apparatus 20 is used in connection with a heated sheet of thermoplastic material designated 22 which is clamped on opposite sides thereof by opposing clamp means 24, 26 and actuated by suitable means (not shown). The web of thermoplastic material 22 is intermittently advanced in a well-known fashion past a heating station which heats the web to its forming temperature, and then to the forming station where the apparatus 20 is employed. After the heated web is clamped in place at the forming station by the opposed clamp members 24, 26, the upper and lower mold members 30, 50 are relatively advanced toward one another to form the various portions of the lid 10 from the thermoplastic web 22.

The upper mold member comprises an outer annular mold element 32 which is attached or otherwise suitably secured to the upper platen 34. Depending flange 36 extends downwardly from the mold element 32 and cooperates with a complementary portion of the lower mold member 50 in forming the rim 14 as will be described below. Shoulder 38 is radially inwardly offset from the inner periphery of mold element 32 and underlies the circular flange 42 of the inner mold element 40 which is preferably solid in construction. The inner mold element 40 is normally biased to the position shown in FIG. 2 by spring means 44 which extends from the upper face of the inner mold element to the lower face of the upper platen 34 within the bore of the annular shaped outer mold element 32. A shaft 46 is secured to the inner mold element 40 and is preferably hollow in construction to conduct a cooling fluid or the like to the inner mold element 40. Additionally, this shaft 46 is actuated by means independent of platen 34 to locate it in various positions during the forming or molding cycle.

The lower mold means 50 also has an outer mold element 52 substantially annular in form which is supported by the lower platen 54. An upstanding projection or boss 56 extends upwardly from the top face of the outer mold element and is provided with a groove 58 into which a portion of the material is positioned by the depending flange 36 of the upper outer mold element 32 for sealing off a predetermined area of the web. A cutoff shoulder 60 cooperates with the depending flange 36 in severing the web as will appear from the discussion that follows. It is to be understood that articles formed from the web may be left attached thereto and then transferred to a separate severing or cutoff apparatus removed from the forming station.

An anner mold element 62 is positioned within the bore of the annular element 52 in opposing relation to the inner mold element 40 of the upper mold member. The inner mold element 62 is normally biased upwardly from the top face of the annular outer mold element 52 by a spring means 64 which is positioned between mold element 62 and the lower platen 54 in the same manner as the upper spring means 44. It is preferable that spring means 64 has less relative strength than spring means 44 for reasons which will subsequently appear. A shaft 66 which may be used to both actuate and conduct fluid or the like to the inner mold element 62 is located within the bore of the annular element 52. Attached or otherwise assembled to the upper face of the inner mold element 62 is a thermal insulator member 68 which is made from a suitable material or heated, and which is used in maintaining a portion of the web at or close to the forming temperature in order to permit an undercut or reverse bend section to be formed.

At the beginning of the molding cycle, the web 22 is clamped in place in a circumferential manner outside the upper and lower mold means 30, 50 respectively, and then the upper and lower mold means are relatively advanced toward one another as shown in FIG. 2. The web 22 is first engaged interiorly of the clamp means by the opposing inner mold elements 40, 62. When this occurs, the upper inner mold element 40, which is cooled by fluid or the like conducted through hollow shaft 46, begins to chill the material engaged thereby to preferably bring the same to a frozen or rigidified state. The insulator member 68 does not interfere, to any great extent, with this cooling process although the lower face of the web clamped between the upper and lower mold elements 40, 62 may not be cooled as much as the other portions.

Further relative advance of the mold members 30, 50 causes the depending flange 36 to position a portion of the web within the groove 58 so as to seal off an area of the web located interiorly thereof as is shown in FIG. 3. At this point of the molding cycle with a predetermined material area sealed off from the remainder of the web and a central portion of this predetermined area clamped between the upper and lower inner mold elements 40, 62 respectively, a pressure differential is established across the sealed material area to position the non-clamped portions thereof against the insulator member 68, the inner mold element 62, the lower face of the outer mold element 52 and the inner periphery of the upstanding projection 56. This may be done either by introducing a positive fluid pressure through the various passages of the upper mold member 30 as shown in FIG. 4 or by creating a vacuum on the underside of the web through suitable means (not shown) in the mold member 50.

An inspection of FIGS. 4 and 6 will reveal that the pressure differential has positioned a portion of the material in close conforming relationship to the exposed surfaces of the insulator member 68 and the lower inner mold element 62. More specifically, it will be noted that a portion of the web designated A will be clamped between the lower surface of upper inner mold element 40 and the upper face of the insulator member 68, a portion B will be positioned adjacent the remaining exposed area of the insulator member 68, and a portion designated C will be positioned adjacent a portion of the outer exposed surface of inner mold element 62. The portions A and C of the web are cooled by virtue of being positioned into contact with the cooled inner mold elements 40, 62, and the portion B will remain at or close to the forming temperature in a relatively plastic state to afford molding thereof.

Once this has taken place, the lower inner mold element 62 can then be forced downwardly within the bore of the outer annular element 52 for causing the portion B of the web to collapse between the portions A and C for forming the undercut. This is best shown in FIG. 7 of the drawings wherein the portion B, which has been maintained close to or at the forming temperature, has been collapsed and folded back upon itself by the relative movement between the upper and lower inner mold elements 40, 62 respectively. This relative movement between the inner mold elements 40, 62 is attributable to the different relative strengths between upper and lower spring means 44, 64, but can also be accomplished by actuating shaft 46 of mold element 40 if desired.

Either after or simultaneously with the forming of the undercut, the article may be severed from the web by the cooperation between depending flange 36 and the cutoff shoulder 60 as is shown in FIG. 5 of the drawings. Thereafter, relative separating movement between the upper and lower mold means 30, 50 respectively will permit the article 10 to be removed from the apparatus or ejected therefrom by suitable means (not shown).

A second embodiment of the invention is shown in FIGS. 8–9 of the drawings and generally comprises a mold member 80 having a cavity 82 into which a portion of a heated web is positioned. The mold 80 is provided with spaced cooled portions 84, 86 and a thermal insulator member 88 positioned therebetween. A mandrel member 90, or air pressure if desired, is used to engage and position a portion of the web against the cooled and thermal insulator portions of the mold member 80 as is shown in FIG. 8 of the drawings. The portions A and C will be cooled in the same manner as the FIGS. 2–7 embodiment with the portion B remaining close to or at the forming temperature of the web. After this has taken place, a telescoping member 92 which surrounds the mandrel 90 cooperates with corner portion 94 of the mold to sever the drawn area from the remainder of the web, the portion 92 then acting to engage the upper end of portion A to force it downwardly and thereby collapse the portion B within the recess 96 formed in the mandrel. The recess 96 is formed only within a small portion of the mandrel 90, and not at the entering end thereof so that it will not hinder the drawing of the material by the mandrel.

It will be understood that the undercut may be formed at various locations in a molded article, and may be of a different size and shape than is shown in the drawings. It will also be appreciated that the lid or closure member 10 is merely illustrative of one form of molded article in which an undercut or other similar construction may be formed. In forming a lid or closure member, it is preferable that mold element 40 have a greater relative size than mold element 62 to aid in setting the undercut formation. In some instances, it may also be desirable to provide grooves or the like on mold element 40 to change the undercut configuration from that shown in the drawings.

From the foregoing, it will now be appreciated that the present invention contemplates a novel and unique method and apparatus for forming severe undercuts or other projecting constructions in a molded article. Complex molding apparatus is eliminated by the present invention, and the method and apparatus may be performed in a fast, repetitive and trouble-free manner.

Although specific embodiments of the invention have been shown and described, it is with full awareness that many modifications thereof are possible. The invention, therefore, is not to be restricted except insofar as is necessary by the prior art and by the spirit of the appended claims.

I claim:

1. A method of forming undercuts in articles made from sheet stock plastic material comprising heating a web of plastic material to its forming temperature for molding thereof, forming an intermediate article of desired configuration in said heated web, cooling spaced portions of said intermediate article below the forming temperature while maintaining an intermediate portion at the forming temperature, and then relatively moving said cooled portions toward each other to cause said intermediate portion to collapse and thereby form an undercut in the ultimate article configuration.

2. A method of forming an undercut in a thermoplastic article comprising the steps of heating a web of thermoplastic material to its forming temperature, forming an intermediate article from said heated web, cooling spaced portions of said intermediate article while maintaining a portion therebetween in a plastic state, and thereafter relatively moving said cooled portions toward each other and cause said portion located therebetween to collapse and fold back upon itself to form the final article shape having an undercut therein.

3. A method of forming undercuts in articles made from sheet stock plastic material comprising heating at least a predetermined area of said web to its forming temperature, cooling a portion of said predetermined area below said forming temperature, forming an intermediate article in said web from said predetermined area by displacing the heated portions relative to said cooled portion, cooling a second portion of said intermediate article spaced from said first cooled portion while maintaining a portion of said intermediate article located therebetween at the forming temperature, and then relatively moving said cooled portions of said intermediate article relative toward each other and cause the portion located therebetween to fold back upon itself and form a completed article having an undercut from therein.

4. A method of forming undercuts in articles made from sheet stock plastic material comprising the steps of heating a web of plastic material to permit ready stretching thereof, moving the heated material between mold portions disposed on opposite sides of said heated web, engaging a predetermined area of said heated web with a cooled mold portion to bring said area below the temperature affording ready stretching thereof, applying a pressure differential to opposite sides of the uncooled portions of the web so as to form an intermediate article therein, said pressure differential also positioning a portion of said intermediate article adjacent another cooled mold portion spaced from said first cooled mold portion, maintaining a portion of the intermediate article located between said cooled mold portions in a plastic state by insulating the same to afford ready stretching thereof, molding an undercut in said intermediate article by relatively moving said cooled mold portions toward each other and cause the insulated portion of the intermediate article located therebetween to collapse and fold back upon itself, and then severing the intermediate article from the web to provide the ultimate discrete article.

5. A method for forming an undercut in an article made from sheet stock plastic material comprising heating a web of plastic material to afford ready stretching thereof, positioning a predetermined area of said heated web adjacent a mold member having cooled areas spaced from each other by a thermally insulated area, the cooled areas of said mold member rendering portions of the web adjacent thereto below its forming temperature while an intermediate portion of the web is maintained at the forming temperature, the cooled portions of said web thereafter being relatively moved toward each other to collapse the thermally insulated intermediate portion of said web and cause it to fold back upon itself to form an undercut therein.

6. Apparatus for molding an undercut in an article formed from a heated web of plastic material comprising first and second mold members disposed on opposite sides of the heated web of material, each of said mold members having cooperating web engaging members, one of said web engaging members being cooled below the forming temperature of said web, the other web engaging member having a thermally insulated portion adjacent the web and a cooled portion spaced therefrom, means for moving the web engaging portions toward each other for clamping and cooling a predetermined web area therebetween, and means for creating a pressure differential across the uncooled portions of said web to form an intermediate article therein, said pressure differential positioning a portion of said intermediate article into contact with the cooled and thermally insulated portions of said one web engaging member, said web engaging members being associated with means for relative movement toward each other to collapse the portion of said intermediate article positioned adjacent the thermally insulated portion of said one web engaging member to form an undercut in said article.

7. Apparatus for forming an article with an undercut therein from a heated web of plastic material comprising first and second opposed mold means disposed on opposite sides of the heated web of material, said mold means having cooperating web engaging members for clamping a portion of the web therebetween, one of said engaging members being cooled in its entirety below the forming temperature of said web, the other said engaging member having a thermally insulated area disposed adjacent the web and a cooled portion spaced therefrom, means for relatively shifting said web engaging members toward each other for clamping and cooling a portion of said web, means for applying a pressure differential through one of said mold members and across the uncooled portions of said web to form an intermediate article therein, said pressure differential also positioning portions of said intermediate article against the cooled and thermally insulated portions of differential spring means being associated with said web engaging members to permit relative movement therebetween after the establishment of the cooled and thermally insulated portions, said one web engaging member, said web engaging members being relatively moved toward each other to collapse the portion of said intermediate article positioned adjacent the thermally insulated portion of one of said web engaging members and cause it to fold back upon itself and form an undercut.

8. The apparatus set forth in claim 7 and including means for severing the article so formed from the remainder of the web to form a completed article.

9. Apparatus for forming an article with an undercut therein from a heated web of plastic material comprising means for positioning a predetermined area of said heated web adjacent a mold member having cold areas spaced from each other by a thermally insulated area, the cold areas of said mold member rendering portions of the web adjacent thereto below its forming temperature while an intermediate portion of the web is maintained at the forming temperature, and means for relatively moving the cooled portions of said web toward each other to collapse said intermediate portion and cause it to fold back upon itself to form an undercut.

References Cited

UNITED STATES PATENTS

| | | | |
|---|---|---|---|
| 3,105,607 | 10/1963 | Edwards | 220—42 |
| 3,173,174 | 3/1965 | Edwards | 18—19 |
| 3,214,797 | 11/1965 | Ollier et al. | 18—19 |
| 3,234,310 | 2/1966 | Edwards | 264—93 |
| 3,244,780 | 4/1966 | Levey et al. | 264—98 |

ROBERT F. WHITE, *Primary Examiner.*

A. R. NOE, *Assistant Examiner.*